Nov. 20, 1928.  
J. F. O'CONNOR  
1,692,689  
FRICTION SHOCK ABSORBING MECHANISM  
Filed May 21, 1927  2 Sheets-Sheet 2
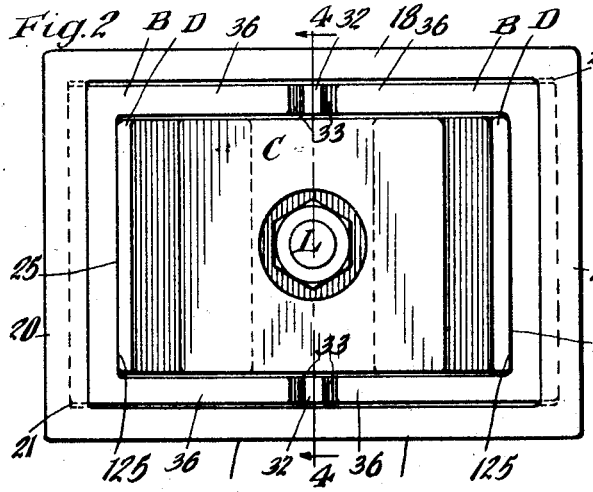
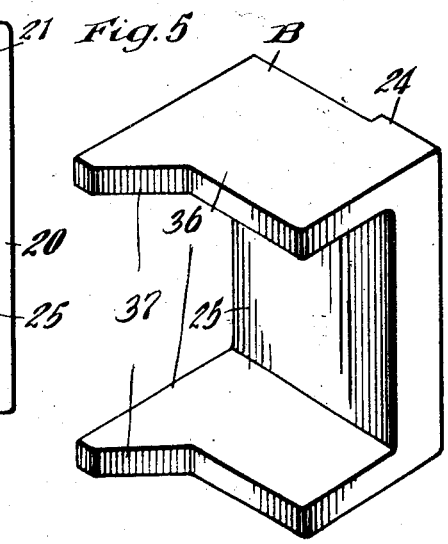
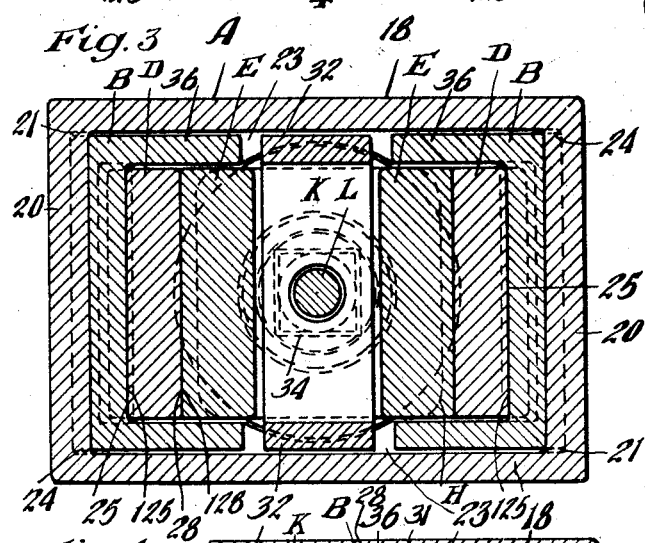
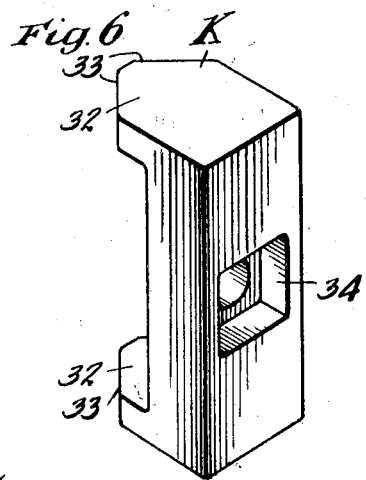
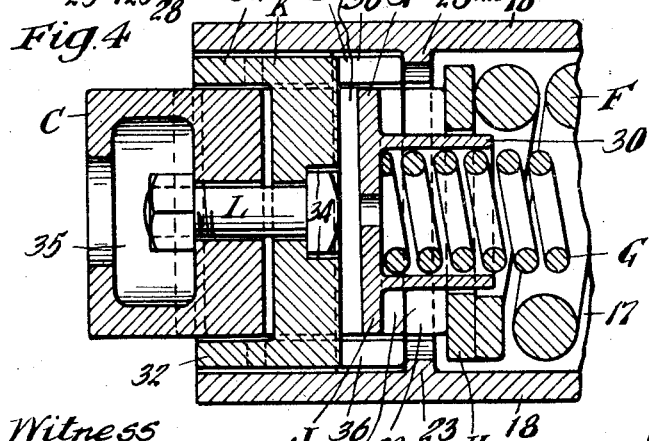
Inventor  
John F. O'Connor Patented Nov. 20, 1928.

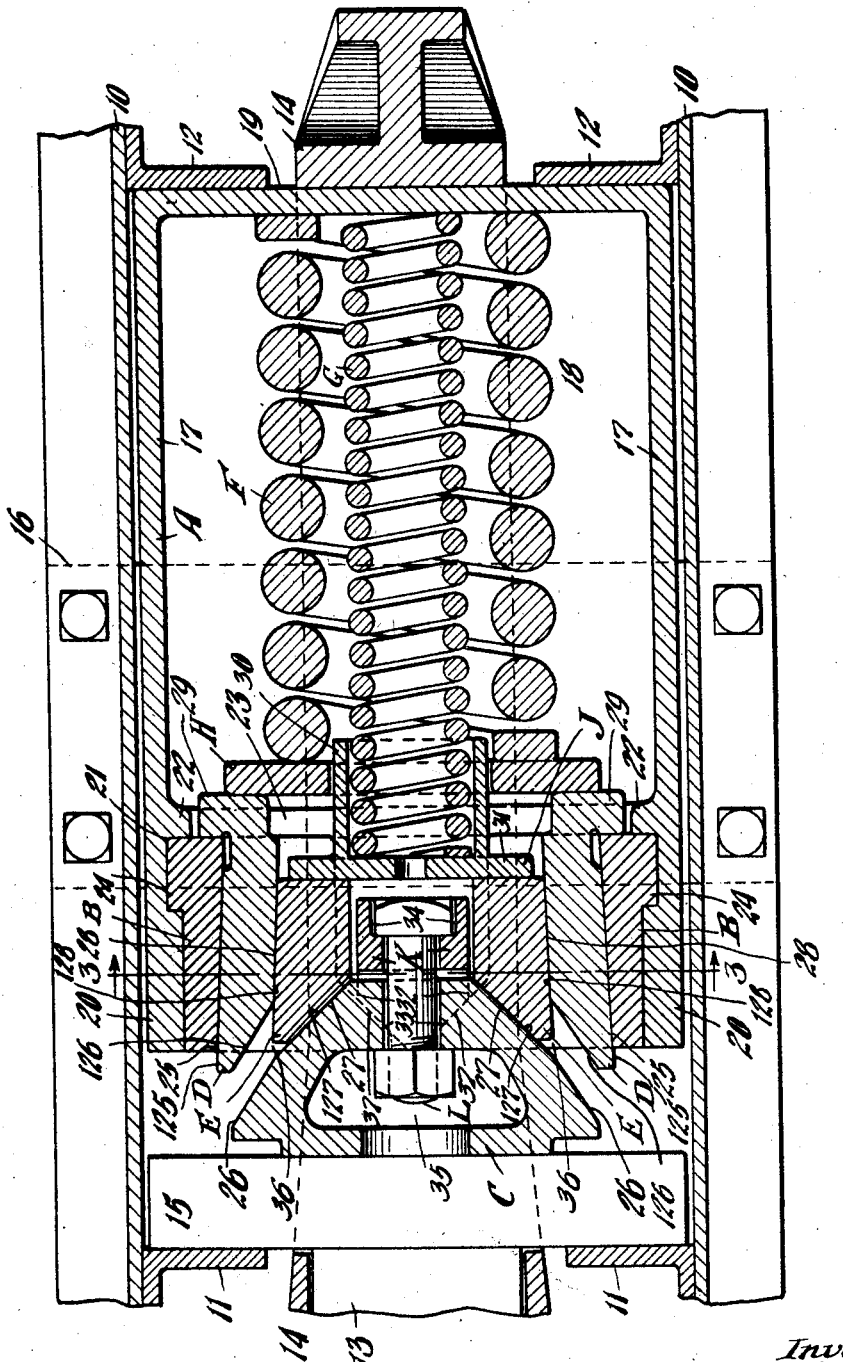

1,692,689

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 21, 1927. Serial No 193,346.

This invention relates to improvements in friction shock absorbing mechanisms.

One object of the invention is to provide a friction shock absorbing mechanism, especially adapted for railway draft riggings, having relatively light frictional resistance during the first part of the compression stroke, followed by heavier frictional resistance during the remainder of the compression stroke, wherein the friction elements are resisted by spring means compressible simultaneously during the last part of the stroke of the mechanism.

Another object of the invention is to provide a frictional shock absorbing mechanism of the character specified, including a friction system comprising a main wedge, wherein simple and efficient retaining means is employed to hold the wedge and other parts of the friction system assembled with the remainder of the mechanism.

A further object of the invention is to provide a friction shock absorbing mechanism including a combined friction shell and spring cage, the cage being provided with detachable liners, with which a friction system cooperates, including a wedge member, wherein simple and efficient retaining means cooperating with the liners is provided for holding the wedge assembled with the mechanism and limiting the outward movement of the same.

A further and more specific object of the invention is to provide a friction shock absorbing mechanism, including a combined friction shell and spring cage having a plurality of friction shoes cooperating with the friction shell, wherein certain of the shoes have limited relative movement with respect to the remaining shoes to provide for initial action, and wherein all of the shoes are adapted to move in unison relatively to the shell during the remainder of the stroke to provide heavier final action, the successive inward movement of the shoes being effected by a wedge pressure transmitting member having two sets of wedge faces cooperating with the shoes, one set of faces being disposed at an angle to the other set, and the shoes having limited movement are resisted by spring means separate from spring means cooperating with the remaining shoes, and wherein both spring means are active during the last part of the compression stroke of the mechanism in opposing movement of the entire friction system.

Other objects and advantages of the invention will more clearly and fully appear from the description and claims hereinafter following.

In the drawings forming a part of this specification, Figure 1 is a longitudinal horizontal sectional view of a railway draft rigging showing my improvements in connection therewith. Figure 2 is a front elevational view of the shock absorbing mechanism proper. Figure 3 is a vertical, transverse sectional view corresponding substantially to the line 3—3 of Figure 1. Figure 4 is a longitudinal vertical sectional view of the front end portion of the mechanism illustrated in Figures 1 and 2, corresponding substantially to the line 4—4 of Figure 2. And Figures 5 and 6 are detailed perspective views of a liner and the retaining element employed in connection with my improved mechanism.

In said drawings, 10—10 indicate channel-shaped center or draft sills of a railway car underframe, having the usual front stop lugs 11—11 and rear stop lugs 12—12 secured to the inner sides thereof. The inner end portion of the draw bar is designated by 13, to which is operatively connected a yoke 14 of well-known form. The shock absorbing mechanism proper, as well as a front main follower 15, are disposed within the yoke 14, and the yoke in turn is supported by a detachable saddle plate 16 secured to the draft sills.

My improved shock absorbing mechanism, as shown, comprises, broadly, a combined friction shell and spring cage A, provided with liners B—B; a main wedge C; two friction shoes D—D; two additional friction shoes E—E; a relatively heavy spring resistance element F; a lighter spring resistance element G; a pair of spring followers H and J; a retaining element K; and a retainer bolt L.

The combined friction shell and spring cage A is in the form of a substantially rectangular box-like casting having longitudinally disposed spaced side walls 17—17, horizontally disposed longitudinally extending spaced top and bottom walls 18—18, and a vertical transverse rear end wall 19. The end wall 19 cooperates with the stop lugs 12 in the manner of the usual rear follower. At the forward end the side walls 17 of the casting A are enlarged, as indicated at 20, the section of the casting A provided with the enlarged wall portions presenting the friction shell portion thereof. The enlarged portions 20 of the side walls are interiorly slotted, as indicated at 21—21, the slots 21 being disposed at the inner ends of the enlargements and extending vertically with respect to the side walls. Rearwardly of the slots, the enlarged portions 20 of the side walls are extended laterally inwardly beyond the planes of the main sections of the enlargements, thereby presenting relatively wide abutment faces 22—22 coinciding with the rear end walls of the slots 21 for a purpose hereinafter set forth. The top and bottom walls 18 of the casting A, inwardly of the open front end of the casting, are provided with transversely disposed top and bottom ribs 23—23, the front faces of which are in substantial alinement with the rear end walls of the slots 21.

The friction shell section of the casting A is provided with a pair of opposed liners B, each of the liners B being in the form of a U-shaped channel member comprising a plate-like portion. Each liner B is provided with a relatively wide vertically disposed outwardly projecting rib 24 on the outer side thereof, seated in the corresponding slot 21 of one of the side walls 17 of the casting A. The inner ends of the liners B bear directly on the abutment faces 22 of the side walls 17 of the casting A and also on the transverse ribs 23 on the top and bottom walls 18. It will be evident that the ribs 24, which cooperate with the slots 21, serve as anchoring means for the liners, preventing longitudinal movement of the liners with respect to the casting A. It is pointed out that by providing the enlarged abutment faces 22 on the walls 17 of the casting A, and also the relatively wide ribs 23 on the top and bottom walls of the casting A, an exceptionally rugged construction of retaining means is provided for holding the liners B against movement inwardly of the casting A. On the inner side, each liner B is provided with a longitudinally disposed flat friction surface 25, inclined with respect to the longitudinal axis of the mechanism. Friction surfaces 25 of the opposed liners B converge inwardly of the mechanism, as most clearly shown in Figure 1.

The wedge block C is in the form of a relatively heavy block having a flat front end face bearing directly on the inner side of the main follower 15. The wedge block C is provided with two sets of wedge faces 26 and 27, arranged in pairs on opposite sides of the wedge. The wedge faces 27 are disposed at the inner end of the wedge and are arranged at a relatively blunt angle with respect to the longitudinal axis of the mechanism, while the wedge faces 26 are disposed forwardly of the wedge faces 27 and are arranged at a relatively keen angle with respect to said axis.

The friction shoes D—D are arranged at opposite sides of the mechanism, each having a flat outer friction surface 125 co-operating with the friction surface 25 of the liner B at the corresponding side of the mechanism. At the forward end, each of the shoes D is provided with a relatively short wedge face 126 correspondingly inclined to the wedge face 26 at the same side of the wedge block C and adapted to cooperate therewith. Rearwardly of the wedge face 126, each shoe D is provided with an inner longitudinally disposed flat friction surface 28, the friction surfaces of the opposed shoes D converging inwardly of the mechanism. At the rear ends the shoes D are laterally enlarged, thereby providing outwardly extending over-hanging projections 29—29 engaging behind the inner ends of the liners B to limit outward movement of the shoes D.

The friction shoes E—E are disposed on opposite sides of the mechanism and cooperate directly with the friction surfaces of the friction shoes D. Each of the shoes E is provided with a longitudinally disposed flat outer friction surface 128 engaging the friction surface 28 of the shoe D at the corresponding side of the mechanism. At the forward end, each shoe E is provided with a flat inner wedge face 127 correspondingly inclined to, and adapted to cooperate with, the wedge face 27 on the same side of the wedge block C. The rear ends of the shoes E present flat abutment faces adapted to co-operate with the spring follower J.

The main spring resistance means of my improved shock absorbing mechanism is disposed within the spring cage section of the casting A and comprises a relatively heavy outer coil F, having the rear end thereof bearing directly on the end wall 19 of the cage, and a lighter inner coil G of greater length than the outer coil and also having the rear end bearing on the end wall 19. The spring follower H, which is in the form of a relatively heavy flat ring-like member, is interposed between the front end of the spring G and the inner ends of the friction shoes D.

The spring follower J, which is in the form of a thimble, comprises a sleeve-like section 30, housing the front end of the spring J, and a disk-like front end section formed integral with the sleeve section 30 and projecting laterally outwardly of the sleeve, thereby presenting a flange-like section 31 bearing on the inner ends of the friction shoes E. As most clearly shown in Figure 1, section 30 of the spring follower J works freely in the opening of the ring-like spring follower H and projects rearwardly beyond the latter in the normal position of the parts.

The retaining element K comprises a vertical bar-like main body portion having horizontally disposed forwardly projecting top and bottom arms 32—32 at the forward side thereof, the arms being provided with forwardly converging inclined faces on the opposite sides thereof. The retaining element K is anchored to the wedge block C by the bolt L, which has the head thereof seated in a recess 34 in the main body portion of the retaining element K and the shank thereof extending through alined openings in the retaining element and the wedge block C. The nut of the bolt is disposed within an opening 35 in the wedge block C and serves to hold the wedge block anchored to the retaining element, the nut being adjustable to obtain the proper over-all length of the mechanism. The retaining element K is limited against outward movement by engagement with cooperating retaining means in the form of top and bottom arms 36—36 on the liners B. The arms 36 of the liners B are in the form of relatively heavy flanges cut away on their inner sides to provide top and bottom inclined faces 37 on the liners B which are corespondingly inclined to the inclined faces 33 on the arms 22 on the same side of the retaining element K. As most clearly shown in Figure 1, the flange-like top and bottom members 36 of the liners B are so disposed that the inclined edge faces 37 of both liners will simultaneously engage the opposite inclined faces on the top and bottom arms 32 of the retaining element K. The top and bottom flanges 36 of the liners B not only serve as a means for limiting the outward movement of the retaining element K, but also function as top and bottom wear plates to prevent wear of the top and bottom walls of the casting A. It will be noted that the flanges 36 overhang both sets of friction shoes D and E and also overhang the wedge block C, thereby fully protecting the top and bottom walls of the casting A, as hereinbefore pointed out. Inasmuch as the wear flanges or plate-like members 36 form a part of the liners B, replacement of all of the friction surfaces of the casting A and all of the surfaces subject to wear is easily effected by merely substituting new liners for worn-out liners.

When the mechanism is assembled, the parts are so adjusted that both the spring F and the spring G will be under initial compression, thereby urging the shoes D and E outwardly. Due to the expansive action of the springs F and G, a slight wedging action will be exerted on the shoes E when the parts are in normal full release position, thereby spreading the shoes E apart and forcing the shoes D against the liners B, holding the latter seated on the side walls of the casting A. As most clearly shown in Figure 1, the parts are so proportioned that when the mechanism is in the full release position the front ends and the wedge faces 126 of the shoes D will be spaced an appreciable distance from the wedge faces 26 of the wedge block C. As shown in Figure 1, the flange 31 of the spring follower J is also spaced from the spring follower H before compression of the mechanism, the clearance between the flange 31 and the spring follower H being sufficient to allow the necessary inward movement of the shoes E during compression stroke of the mechanism without engagement of the flange 31 of the spring follower J with the spring follower H.

In assembling the mechanism, the main springs F and G and the spring followers H and J are first inserted into the casing through the front end thereof. The retaining element K, with the bolt assembled therewith, is next entered into the casing. The two liners are then placed in position engaging the ribs 24 thereof within the slots 21. The outer set of friction shoes D are then inserted and the enlargements 29 at the inner ends thereof engaged in back of the liners B. Next the inner set of friction shoes E and the wedge block C are placed in position, the wedge block C being secured to the retainer bolt L by means of the nut on said bolt.

The operation of my improved shock absorbing mechanism, assuming a compression stroke, is as follows: The front main follower 15 and the combined friction shell and spring cage A will be moved relatively toward each other, thereby forcing the wedge block C inwardly of the mechanism. Due to the interengaging wedge faces of the wedge block C and the shoes E, the latter will be forced apart, thereby bringing the friction surfaces thereof into intimate contact with the friction surfaces of the shoes D. As the wedge C is forced inwardly, the shoes E will be carried therewith, sliding on the friction surfaces of the shoes D resisted by the spring J. During the action of the mechanism just described, there will be substantially no movement of the outer pair of friction shoes D, the same being held in their outermost position by the relatively heavy spring resistance F. The inward movement of the wedge block C and the shoes E will continue until the wedge faces 26 of the wedge block C engage the wedge faces 126 of the shoes D, whereupon the shoes D will be forced apart by the keener-acting wedge faces of these wedges and shoes, thereby pressing the friction surfaces of the shoes D more tightly against the friction surfaces of the liners B. After engagement of the wedge C with the shoes D, the latter will be carried inwardly of the mechanism on the friction surfaces of the liners B, thus greatly augmenting the frictional resistance offered during the last part of the compression stroke. It is also pointed out that the resistance will be increased during the last part of the compression stroke due to the shoes D being resisted in their inward movement by the heavy spring resistance F. Inasmuch as the inner set of friction shoes E also continues to move inwardly of the mechanism with the wedge during the last part of the compression stroke, the inner coil J of the spring resistance will also be compressed, giving additional resistance. It is further pointed out that on account of the converging relation of the cooperating friction surfaces of the shoes D and E, and also on account of the converging relation of the cooperating friction surfaces of the shoes D and the liners B, a differential action will be had, causing the wedge faces of the shoes D and E to slip on the wedge faces of the wedge block, thereby forcing the shoes inwardly of the mechanism at a greater rate of travel than the wedge block itself, thus producing additional compression of the two spring resistance elements. The described action will continue either until the actuating force is reduced or the front main follower 15 comes into engagement with the front end of the combined friction shell and spring cage A, whereupon the actuating force will be transmitted directly through the follower 15 and the combined spring cage and friction shell A to the stop lugs of the draft sills, thus providing a column member of exceptional strength and preventing undue compression of the main spring resistance elements.

During release of the mechanism when the actuating force is reduced, the expansive action of the compressed springs F and G will force the friction shoes D and E outwardly of the mechanism. Outward movement of the friction shoes D will be limited by engagement of the enlargements 29 thereof with the inner ends of the liners B. Outward movement of the friction shoes E will be limited by the wedge block C, which outward movement is in turn limited by the retainer bolt L, which is anchored to the retaining element K, movement of which is arrested by engagement of the inclined faces 33 on the arms 32 thereof with the inclined abutment faces 37 of the liners B.

From the preceding description, taken in connection with the drawings, it will be evident that I have provided an exceedingly simple and efficient means which is readily removable for retaining the parts of the mechanism assembled wherein the retaining means forms a part of the liners which are removable, thereby making the parts which are subjected to the greatest wear readily replaceable.

It will also be evident that my improved arrangement permits the use of relatively simple spring resistance means which will resist the movement of all of the friction elements during the entire compression stroke of the mechanism, thus avoiding the necessity of providing additional or auxiliary spring resistance elements which oppose the inward movement of the one set of friction shoes with respect to the other set.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a combined friction shell and spring cage; of a friction system cooperating with the friction shell section of the cage; removable liners mounted on opposite walls of the friction shell, said liners having friction surfaces cooperating with the friction system; wear elements for the remaining walls of the friction shell, said wear elements forming a part of the liners; a retaining element for limiting outward movement of the friction system, said retaining element having its outward movement limited by engagement with the wear elements; and spring resistance means opposing movement of the friction system inwardly of the mechanism.

2. In a friction shock absorbing mechanism, the combination with a friction shell, said shell having opposed walls provided with liners anchored thereto and having longitudinally disposed friction surfaces, said liners having top and bottom wear plate sections formed integral therewith; of friction means cooperating with the liners; spreading means adapted to receive the actuating force, said friction means and spreading means being disposed between the top and bottom wear plate sections and embraced thereby; and a main spring resistance opposing inward movement of the friction means.

3. In a friction shock absorbing mechanism, the combination with a friction shell having opposed side walls provided with detachable liners, said liners having inwardly extending spaced wear plate sections protecting the remaining walls of the shell; of friction shoes cooperating with said liners, the shoes being interposed between said spaced plate sections; a wedge member engaging the shoes; an anchoring element for the wedge, said anchoring element and wear plate sections having cooperating abutment faces for limiting outward movement of the anchoring element; and a main spring resistance within the shell cooperating with the shoes.

4. In a friction shock absorbing mechanism, the combination with a combined friction shell and spring cage, said combined friction shell and cage being provided with liners presenting interior inwardly converging opposed friction surfaces, said liners being also provided with inwardly projecting spaced flanges, the flanges of said opposed liners having the edges thereof inclined with respect to the longitudinal axis of the mechanism, the inclined edges of the opposed liners diverging inwardly of the mechanism; of a friction means cooperating with the friction surfaces of the liners, said friction means including a spreading element; a retaining element, said spreading element being anchored to the retaining element, said retaining element having arms provided with inclined abutment faces cooperating with the inclined faces of the flanges of the liners to limit outward movement of the retaining element; and a spring resistance means opposing inward movement of the friction means.

5. In a friction shock absorbing mechanism, the combination with a column element having friction surfaces thereon; of a main spring resistance; an additional spring resistance; a plurality of relatively movable friction elements having engaging friction surfaces, certain of said elements engaging the friction surfaces of said column element and are movable longitudinally thereof and resisted in their movement by said main spring resistance; movement of the remaining elements being resisted by said additional spring resistance during the entire compression stroke of the mechanism, said additional spring also resisting relative movement of said friction elements; and wedge pressure transmitting means having wedge faces engageable with each of said relatively movable friction elements during the compression stroke of the mechanism.

6. In a friction shock absorbing mechanism, the combination with a friction member; of a plurality of cooperating relatively movable friction elements, certain of which have engagement with said member and are relatively movable thereto; pressure transmitting means having wedge faces engageable with said last named elements and also having additional wedge faces continuously cooperable with the remaining elements, all of said wedge faces being operative during the compression stroke of the mechanism; a main spring resistance opposing relative movement of the friction member and the elements having engagement therewith; and an additional spring resistance opposing during the entire compression stroke of the mechanism movement of the elements continuously engaging the wedge.

7. In a friction shock absorbing mechanism, the combination with a friction member; of a plurality of cooperating relatively movable friction elements, certain of which have engagement with said member and are relatively movable thereto; pressure transmitting means having wedge faces cooperating with said last-named elements and also having additional wedge faces cooperating with the remaining elements, said first-named wedge faces being normally disengaged from the cooperating elements to permit relative movement of said cooperating elements and provide for preliminary action during the compression of the mechanism; a spring resistance opposing relative movement of said friction member and the elements having engagement therewith; and an independent spring resistance opposing movement of the remaining friction elements during the entire compression stroke of the mechanism.

8. In a friction shock absorbing mechanism, the combination with a friction element; of a friction wedge system cooperating with said element, said system including a plurality of friction shoes having limited relative movement and spreading means co-operating with the shoes, said spreading means and each of said shoes having cooperating sets of wedge faces, the wedge faces of one set being angularly disposed with respect to the wedge faces of the other set; pressure transmitting means; spring resistance elements cooperating with said pressure transmitting means, one of said elements resisting inward movement of certain of said shoes and the other spring resistance element opposing inward movement of the remaining shoes during the entire compression stroke of the mechanism, said pressure transmitting element directly cooperating with said last named shoes.

9. In a friction shock absorbing mechanism, the combination with a friction shell having a plurality of friction surfaces and spring abutment means thereon; of two sets of friction shoes, said sets having cooperating friction surfaces and being relatively movable with reference to each other, one of said sets having frictional engagement with the friction surfaces of said element; a main spring resistance interposed between said abutment means and said last-named set of shoes; a second spring resistance interposed between said abutment means and the other set of shoes; a wedge member having a plurality of wedge faces cooperating with the two sets of shoes, the cooperating wedge faces of said wedge and shoes which engage the friction element being normally separated to permit limited relative movement of said two sets of shoes during preliminary action of the mechanism.

In witness that I claim the foregoing I have hereunto subscribed my name this 17th day of May, 1927.

JOHN F. O'CONNOR.